US011714647B2

(12) United States Patent
Hansen et al.

(10) Patent No.: US 11,714,647 B2
(45) **Date of Patent: *Aug. 1, 2023**

(54) RESOURCE ALLOCATION IN A MULTI-PROCESSOR SYSTEM

(71) Applicant: Texas Instruments Incorporated, Dallas, TX (US)

(72) Inventors: Eric Robert Hansen, McKinney, TX (US); Krishnan Sridhar, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,288

(22) Filed: Nov. 16, 2021

(65) Prior Publication Data

US 2022/0075621 A1 Mar. 10, 2022

Related U.S. Application Data

(63) Continuation of application No. 16/267,213, filed on Feb. 4, 2019, now Pat. No. 11,210,095.

(Continued)

(51) Int. Cl.
*G06F 9/30* (2018.01)
*G06F 13/16* (2006.01)

(Continued)

(52) U.S. Cl.
CPC ...... *G06F 9/30105* (2013.01); *G06F 13/1642* (2013.01); *G06F 13/364* (2013.01);

(Continued)

(58) Field of Classification Search
None
See application file for complete search history.

(56) References Cited

U.S. PATENT DOCUMENTS 6,745,274 B1 6/2004 Snyder
6,779,072 B1 8/2004 Sauder (Continued)

FOREIGN PATENT DOCUMENTS

GB 2593716 A * 10/2021 ......... G06F 12/1416
WO WO2015075505 A1 5/2015

OTHER PUBLICATIONS

'Formal based Methodology for Infering Memory mapped Registers' by Haytham Saafan et al., 2016, 17th International Workshop on Microprocessor and SOC Test and Verification. (Year: 2016).*

(Continued)

*Primary Examiner* — Steven G Snyder
(74) *Attorney, Agent, or Firm* — Michael T. Gabrik; Frank D. Cimino

(57) ABSTRACT

A system includes a memory-mapped register (MMR) associated with a claim logic circuit, a claim field for the MMR, a first firewall for a first address region, and a second firewall for a second address region. The MMR is associated with an address in the first address region and an address in the second address region. The first firewall is configured to pass a first write request for an address in the first address region to the claim logic circuit associated with the MMR. The claim logic circuit associated with the MMR is configured to grant or deny the first write request based on the claim field for the MMR. Further, the second firewall is configured to receive a second write request for an address in the second address region and grant or deny the second write request based on a permission level associated with the second write request.

20 Claims, 2 Drawing Sheets

Related U.S. Application Data

(60) Provisional application No. 62/722,755, filed on Aug. 24, 2018.

(51) Int. Cl.
*G06F 13/364* (2006.01)
*G06F 21/79* (2013.01)
*G06F 21/52* (2013.01)

(52) U.S. Cl.
CPC .............. *G06F 21/52* (2013.01); *G06F 21/79* (2013.01); *G06F 2212/206* (2013.01)

(56) References Cited

U.S. PATENT DOCUMENTS 6,970,963 B2 11/2005 Snyder
7,275,121 B1 9/2007 Wong
7,870,346 B2 1/2011 Byers
8,095,759 B2 * 1/2012 Abts ...................... G06F 21/52 712/30
9,317,452 B1 4/2016 Forschmiedt
10,534,736 B1 1/2020 Reghunath
10,560,428 B2 2/2020 Mundra
10,824,572 B2 11/2020 Norris
2004/0059818 A1 3/2004 Snyder
2004/0193743 A1 9/2004 Byers
2006/0248250 A1 11/2006 Sarkar
2007/0011419 A1 1/2007 Conti
2008/0244155 A1 10/2008 Lee
2010/0306489 A1 * 12/2010 Abts ...................... G06F 21/52 712/30
2016/0299859 A1 10/2016 Popa
2017/0315944 A1 11/2017 Mayer
2019/0049916 A1 2/2019 Deka
2019/0058691 A1 2/2019 Mundra
2020/0034572 A1 1/2020 Mundra
2020/0210360 A1 7/2020 Reghunath

OTHER PUBLICATIONS

'AN4730—Application note—Using the Firewall embedded in STM32L0/L4/L4+ Series MCUs for secure access to sensitive parts of code and data' Aug. 2019. (Year: 2019).*

* cited by examiner

RESOURCE ALLOCATION IN A MULTI-PROCESSOR SYSTEM

CROSS-REFERENCE TO RELATED APPLICATIONS

The present application claims priority to U.S. patent application Ser. No. 16/267,213, which was filed Feb. 4, 2019, which claims priority to U.S. Provisional Patent Application No. 62/722,755, which was filed Aug. 24, 2018, is titled "Resource Allocation In A Multi-Processor System," and is hereby incorporated herein by reference in its entirety.

BACKGROUND

A system-on-a-chip (SOC) is used in industrial applications and automotive applications in which certain processes executed by the SOC are considered critical, while other processes executed by the SOC are considered non-critical. For example, in the automotive context, certain processes related to safety (e.g., a gauge display, audio notifications) are considered critical, other processes not related to safety are considered non-critical. An exemplary automotive SOC includes a safety processor and a general purpose processor, which historically have been separate devices, but which an SOC may integrate onto a single die. Various resources of the SOC thus may be shared between critical processes and non-critical processes.

SOCs use a series of memory-mapped registers (MMRs) to configure, control, or otherwise interact with various modules and sub-blocks, such as peripheral control blocks of the SOC. For example, an SOC processor writes data to an address that maps to a MMR, which, upon having that data written configures an element of a peripheral control block (e.g., clock selection, clock division, signal multiplexing, module behavior). With multiple processors or processes operating at the same time on the SOC, a non-critical process should not be able to overwrite or otherwise corrupt a MMR that is in use by a critical process.

SUMMARY

In accordance with at least one example of the disclosure, a system includes a memory-mapped register (MMR) associated with a claim logic circuit, a claim field for the MMR, a first firewall for a first address region, and a second firewall for a second address region. The MMR is associated with an address in the first address region and an address in the second address region. The first firewall is configured to pass a first write request for an address in the first address region to the claim logic circuit associated with the MMR. The claim logic circuit associated with the MMR is configured to grant or deny the first write request based on the claim field for the MMR. Further, the second firewall is configured to receive a second write request for an address in the second address region and grant or deny the second write request based on a permission level associated with the second write request.

In accordance with another example of the disclosure, a method includes receiving a first write request for an address in a first address region, where the address in the first address region is associated with a memory-mapped register (MMR). The method also includes granting the first write request based on a claim field associated with the first MMR and receiving a second write request for an address in a second address region, where the address in the second address region is associated with the MMR. The method further includes granting the second write request based on a permission level associated with the second write request.

BRIEF DESCRIPTION OF THE DRAWINGS

For a detailed description of various examples, reference will now be made to the accompanying drawings in which.

DETAILED DESCRIPTION

Examples of the present disclosure address the foregoing problems by assigning multiple proxy addresses to at least some of the MMRs of the SOC. For example, a respective address in a first region of proxy addresses (Proxy0 region) and a respective address in a second region of proxy addresses (Proxy1 region) are mapped to or associated with the same MMR. A firewall is provided for each region of proxy addresses. A critical process or a critical processor attempts to write to a MMR by accessing its address in the Proxy1 region. Similarly, a non-critical process or a non-critical processor should attempt to write to a MMR by accessing its address in the Proxy0 region. Thus, the firewall for the Proxy1 region rejects any attempt by a non-critical process to write to a MMR by accessing its address in the Proxy1 region. The firewall for the Proxy1 region grants attempts by critical processes to write to MMRs by accessing its address in the Proxy1 region.

A claim register contains claim fields (e.g., a claim bit) for the MMRs, which indicate whether a particular MMR is currently claimed, or in use by, a critical process or a process having a sufficiently high permission level. Thus, when a critical process wishes to protect a particular MMR from non-critical process write access (or write access by a process having an insufficient permission level), it sets the claim bit or claim field associated with that MMR with a write access through the claim register's Proxy1 address. The critical process generates the write to the claim register to set the claim bit associated with the MMR independently (before or after) of writing to the MMR itself through either proxy address. However, Proxy0 write protection is only enforced when a claim bit or field is set. For example, when a non-critical process attempts to write to a MMR through the Proxy0 region, the request is denied if the claim bit is set (indicating that MMR is being used by a critical process), and the request is granted if the claim bit is not set. When a critical process no longer requires protected use of a MMR, it generates a write request via the Proxy1 region to the claim register to unset the claim bit associated with that MMR's address. In this way, critical processes are given exclusive write access to claimed or protected MMRs (having their claim bit set) while non-critical processes are unable to write to a claimed or protected MMR (having its claim bit set). Thus, any MMR may be dynamically write-protected by a critical process without requiring more complex protection schemes such as a hardware firewall for each individual MMR, which would consume additional area and increase programming complexity.

Figure 1:
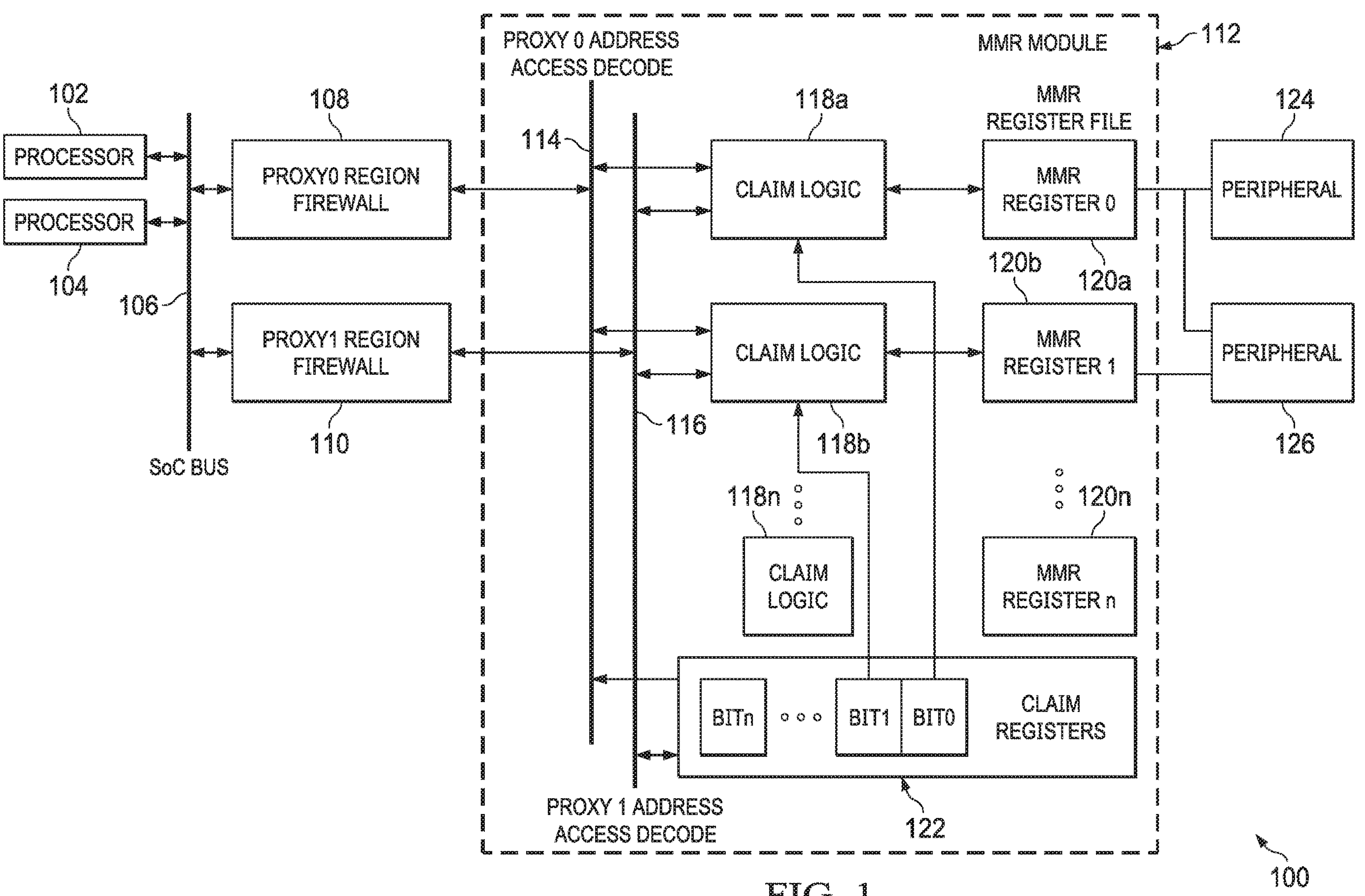
FIG. 1 shows a block diagram of a system in accordance with various examples.

FIG. 1 shows a portion of a SOC 100 in accordance with examples of this disclosure. The SOC includes processors 102, 104 coupled to an address and data bus 106. In this example, the processor 102 is a critical processor 102 that executes critical processes, such as safety-related processes in the context of an automotive application. The processor 104 is a non-critical processor 104 that executes non-critical processes, which are not safety-related processes in the context of an automotive application.

The SOC 100 also includes a MMR module 112, which includes a plurality of MMRs 120*a-n*. In some examples, the MMRs 120*a-n* are contiguous in address space. The MMR module 112 also includes at least one claim register 122, which in this case includes claim bits, where each claim bit is associated with one of the MMRs 120*a-n*. The MMRs 120*a-n* are coupled to one or more peripherals, such as peripheral 124 and peripheral 126. Writing data to the MMRs 120*a-n* may cause miscellaneous control operations to be carried out with regard to the peripherals 124, 126. For example, writing data to the MMR 120*a* determines a clock source for use by the peripherals 124, 126, while writing data to the MMR 120*b* determines a signal multiplexing behavior for the peripheral 126. The scope of this disclosure is not limited to any particular set of MMR, peripheral, and other module behaviors. The MMR module 112 also includes claim logic circuits 118*a-n*, each of which is associated with and coupled to one of the MMRs 120*a-n*. The claim logic circuits 118*a-n* are also coupled to the claim register 122. Each claim logic circuit 118*a-n* is configured to ascertain the status of its associated MMR's 120*a-n* associated claim bit (or claim field), for example in response to a write request directed to the associated MMR 120*a-n*. The claim logic circuits 118*a-n* are explained in further detail below.

The SOC 100 also includes a first firewall 108 and a second firewall 110 coupled to the address/data bus 106. The first firewall 108 is associated with a first region of proxy addresses (e.g., Proxy0 region), while the second firewall 110 is associated with a second region of proxy addresses (e.g., Proxy1 region). As explained above, each MMR 120*a-n* is associated with an address in the Proxy0 region and with an address in the Proxy1 region. For example, a particular MMR 120*a* may be written to by generating a write request to an address in the Proxy0 region or by generating a write request to an address in the Proxy1 region, subject to the restrictions explained in further detail below.

The firewalls 108, 110 are programmed in an application-specific manner to implement different permission levels (in one example, differentiating between a critical process and a non-critical process). For example, the firewall 108 may be initialized (e.g., using trusted firmware) to permit access by both the critical processor 102 and the non-critical processor 104, while the firewall 110 is initialized to permit access by only the critical processor 102. In this example, a permission threshold exists between the critical processor 102 and the non-critical processor 104. Thus, the firewall 110 permits access (e.g., a write request) by a process having a permission level above the threshold (e.g., critical processor 102) and denies access by a process having a permission level below the threshold (e.g., non-critical processor 104). The firewall 108 permits access by both the critical processor 102 and the non-critical processor 104. Although the example of FIG. 1 only includes two permission levels, additional permission levels may be implemented using additional firewalls and proxy address regions, as discussed in further detail below.

The critical processor 102 and the non-critical 104 processor are configured to generate write requests for the MMRs 120*a-n*, for example to control operation of the peripherals 124, 126. A write request may include an address that corresponds to the MMR 120*a-n* to be written to, data to be written to the MMR 120*a-n*, and processor or process information (e.g., a processor ID). The processor or process information, for example, identifies the processor that originated the write request, or is information that could otherwise be associated with a permission level for the originator of the write request. In some examples, a permission level is inherently specified by identification of the originating processor, for example where the critical processor 102 has a higher permission level, and the non-critical processor 104 has a lower permission level.

In the example of FIG. 1, the critical processor 102 is configured to access the MMRs 120*a-n* through their Proxy1 region addresses. Similarly, the non-critical processor 104 is configured to access the MMRs 120*a-n* through their Proxy0 region addresses. Thus, the Proxy1 firewall 110 is configured to grant write requests having a processor ID corresponding to the critical processor 102. On the other hand, the Proxy1 firewall 110 is configured to deny write requests having a processor ID corresponding to the non-critical processor 104.

The claim logic circuits 118*a-n* serve as additional gatekeepers on the ability to write to the MMRs 120*a-n*. The claim logic circuits 118*a-n* are coupled to the Proxy0 region firewall 108 by a Proxy0 address decode 114, and to the Proxy1 region firewall 110 by a Proxy1 address decode 116. Thus, the claim logic circuits 118*a-n* may determine from which proxy region—Proxy0 or Proxy1—a write request originated. The Proxy1 region firewall 110 only allows write requests from the critical processor 102, which are allowed to overwrite even an MMR 120*a-n* that is in use by the non-critical processor 104. Thus, when a claim logic circuit 118*a* receives a write request from the Proxy1 address decode 116 coupled to the Proxy1 region firewall 110, the claim logic circuit 118*a* carries out the write request and writes the data to its associated MMR 120*a*. As explained above, if the critical process requires access to the MMR 120*a* to be protected against writes by non-critical processor 104 or processes running on the non-critical processor 104, the critical process generates a separate write to the claim register 122 to update the associated claim field or claim bit (Bit0 in this example) of the claim register 122 (e.g., by "setting" the bit to a '1'). In some examples, the critical processor 102 may execute multiple critical processes having the same permission level, and thus the Proxy1 region firewall 110 allows write requests from such critical processes and the claim logic circuit 118*a* carries out write requests from such critical processes.

The Proxy0 region firewall 108 receives write requests from the non-critical processor 104; however, since the Proxy0 region firewall 108 does not have insight to whether a MMR 120*a-n* is in use by the critical processor 102, the Proxy0 region firewall 108 passes write requests on to the Proxy0 address decode 114. Thus, when a claim logic circuit 118*a* receives a write request from the Proxy0 address decode 114 coupled to the Proxy0 region firewall 108, the claim logic circuit 118*a* accesses the associated claim bit (Bit0 in this example) and determines whether Bit0 is set. If Bit0 is set, indicating that the MMR 120*a* is in use by the critical processor 102, the claim logic circuit 118*a* blocks the write request from the non-critical processor 104 to the MMR 120*a*. In some examples, the claim logic circuit 118*a* may update one or more status registers (e.g., an error bit) to reflect the occurrence of an error as a result of blocking the write request from the non-critical processor 104 to the MMR 120*a*. An interrupt may be triggered as a result of the update to the status registers and/or error bit, which may cause a notification to the non-critical processor 104. However, if Bit0 is not set, the claim logic circuit 118*a* carries out the write request and writes the data to its associated MMR 120*a*. Since writes to the claim register 122 are only permitted via the Proxy1 region firewall 110 (which would block a non-critical process write request) and the Proxy1 address decode 116, non-critical processes are not able to set claim bits, although a non-critical process may read from the claim register 122 in some examples.

As a result of the foregoing scheme to limit access to the MMRs 120*a-n*, a non-critical process that has become corrupted and attempts to access the MMRs 120*a-n* through the Proxy1 address region will be blocked by the Proxy1 region firewall 110 because the processor ID will still indicate that the request is from the non-critical processor 104. Further, the critical processor 102 is given write exclusivity over MMR 120*a-n* access in all cases, since its access is through the Proxy1 region firewall 110, which the claim logic circuits 118*a-n* allow in all cases. Finally, the non-critical processor 104 is unable to overwrite an MMR 120*a-n* in use and protected by the critical processor 102 (for which the critical processor 102 has set the associated claim bit or field), since the claim bit or field will indicate that the MMR 120*a-n* is in use by the critical processor 102 and the claim logic circuits 118*a-n* will not allow a request from the Proxy0 address decode 114 to overwrite an in-use and protected MMR 120*a-n*.

FIG. 1 illustrates an example with two permission levels (e.g., critical processor 102 and non-critical processor 104). However, other examples of this disclosure extend the concepts described above with respect to FIG. 1 to additional numbers of permission levels. For example, four permission levels are implemented by coupling first, second, third, and fourth firewalls to the address/data bus 106. Each firewall is associated with a region of proxy addresses (e.g., Proxy0 region, Proxy1 region, Proxy2 region, and Proxy3 region). Similar to above, each MMR 120*a-n* is associated with an address in each region. For example, a particular MMR 120*a* may be written to by generating a write request to an address in the Proxy0 region, the Proxy1 region, the Proxy2 region, or the Proxy3 region, subject to the restrictions explained in further detail below.

For ease of reference, in this example there are four processors of differing permission levels—P0, P1, P2, and P3, with P3 being the highest permission level (e.g., critical processor 102)—that may attempt to write to the MMRs 120*a-n*. The P0 level processor is configured to address its write requests to the Proxy0 region addresses and firewall. The P1 level processor is configured to address its write requests to the Proxy1 region addresses and firewall. The P2 level processor is configured to address its write requests to the Proxy2 region addresses and firewall. The P3 level processor is configured to address its write requests to the Proxy3 region addresses and firewall.

Thus, the Proxy3 firewall is configured to grant write requests originating from the P3 level processor (e.g., above a permission threshold for the Proxy3 firewall). On the other hand, the Proxy3 firewall is configured to deny write requests originating from the P0-P2 level processors (e.g., below a permission threshold for the Proxy3 firewall). The Proxy2 firewall is configured to grant write requests originating from the P2 level processor (e.g., above a permission threshold for the Proxy2 firewall) and to deny write requests originating from the P0 and P1 level processors (e.g., below a permission threshold for the Proxy2 firewall). The Proxy1 firewall is configured to grant write requests originating from the P1 level processor (e.g., above a permission threshold for the Proxy1 firewall) and to deny write requests originating from the P0 level processor (e.g., below a permission threshold for the Proxy1 firewall). The Proxy0 region firewall does not have particular insight to whether a MMR 120*a-n* is in use by a higher level processor, and thus the Proxy0 region firewall passes write requests from the P0 level processor on to the Proxy0 address decode.

As above, the claim logic circuits 118*a-n* serve as additional gatekeepers on the ability to write to the MMRs 120*a-n*. In this example, the claim logic circuits 118*a-n* are coupled to the Proxy0 region firewall by a Proxy0 address decode, to the Proxy1 region firewall by a Proxy1 address decode, to the Proxy2 region firewall by a Proxy2 address decode, and to the Proxy3 region firewall by a Proxy3 address decode.

Similar to above, the Proxy3 region firewall only allows write requests from the P3 level, or critical processor 102, which is allowed to overwrite even an MMR 120*a-n* that is in use by the P0-P2 level processors. Thus, when a claim logic circuit 118*a* receives a write request from the Proxy3 address decode coupled to the Proxy3 region firewall, the claim logic circuit 118*a* carries out the write request and writes the data to its associated MMR 120*a*. If the P3 level processor requires protected access of the MMR 120*a* (from the P0-P2 level processors), the P3 level processor generates a separate write to the claim register 122 to update the associated claim field of the claim register 122 (e.g., by "setting" the bit to a '11'). In some examples, the claim register 122 is doubled in length to accommodate two bits per claim field per MMR 120*a-n*, while in other examples a second claim register (not shown for simplicity) is utilized, where a claim field comprises one bit from the first claim register and one bit from the second claim register. The scope of this disclosure is not limited to any particular implementation of the claim register and per-MMR claim fields.

The Proxy2 region firewall only allows write requests from the P2 level, which is allowed to overwrite an MMR 120*a-n* that is in use by the P0 and P1 level processors, but not that is in use by the P3 level processor. Thus, when a claim logic circuit 118*a* receives a write request from the Proxy2 address decode coupled to the Proxy2 region firewall, the claim logic circuit 118*a* accesses the associated claim field and determines whether the claim field indicates the P3 level processor is using the MMR 120*a* (e.g., being set to '11'). If the claim field indicates that the MMR 120*a* is in use by the P3 level processor, the claim logic circuit 118*a* blocks the write request from the P2 level processor. However, if the claim field is any value other than '11', the claim logic circuit 118*a* carries out the write request and writes the data to its associated MMR 120*a*. In this example, if the P2 level processor requires protected access of the MMR 120*a* (from the P0 or P1 level processors), the P2 level processor generates a separate write to the claim register 122 to update the associated claim field of the claim register 122 (e.g., by "setting" the bit to a '10').

The Proxy1 region firewall only allows write requests from the P1 level, which is allowed to overwrite an MMR 120*a-n* that is in use by the P0 level processor, but not that is in use by the P2 or P3 level processors. Thus, when a claim logic circuit 118*a* receives a write request from the Proxy1 address decode coupled to the Proxy1 region firewall, the claim logic circuit 118*a* accesses the associated claim field and determines whether the claim field indicates the P2 or P3 level processors are using the MMR 120*a* (e.g., being set to '11' or '10'). If the claim field indicates that the MMR 120*a* is in use by the P2 or P3 level processors, the claim logic circuit 118*a* blocks the write request from the P1 level processor. However, if the claim field is any value other than '11' or '10', the claim logic circuit 118*a* carries out the write request and writes the data to its associated MMR 120*a*. In this example, if the P1 level processor requires protected access of the MMR 120*a* (from the P0 level processor), the P1 level processor generates a separate write to the claim register 122 to update the associated claim field of the claim register 122 (e.g., by "setting" the bit to a '01').

The Proxy0 region firewall only allows write requests from the P0 level, which is not allowed to overwrite an MMR 120*a-n* that is in use by the P1-P3 level processors. Thus, when a claim logic circuit 118*a* receives a write request from the Proxy1 address decode coupled to the Proxy1 region firewall, the claim logic circuit 118*a* accesses the associated claim field and determines whether the claim field indicates the P1-P3 level processors are using the MMR 120*a* (e.g., being set to any value other than '00'). If the claim field indicates that the MMR 120*a* is in use by the P1-P3 level processors, the claim logic circuit 118*a* blocks the write request from the P0 level processor. However, if the claim field is '00', the claim logic circuit 118*a* carries out the write request and writes the data to its associated MMR 120*a*.

Still further examples of this disclosure include additional permission levels, supported by extending the schemes described above. Further, the MMR module 112 of FIG. 1 may comprise one of multiple partitions of MMRs. For example, the MMR module 112 may be repeated as multiple partitions, with each partition having a Proxy0 region of addresses and a Proxy1 region of addresses (each with an associated firewall as an access point).

Figure 2:
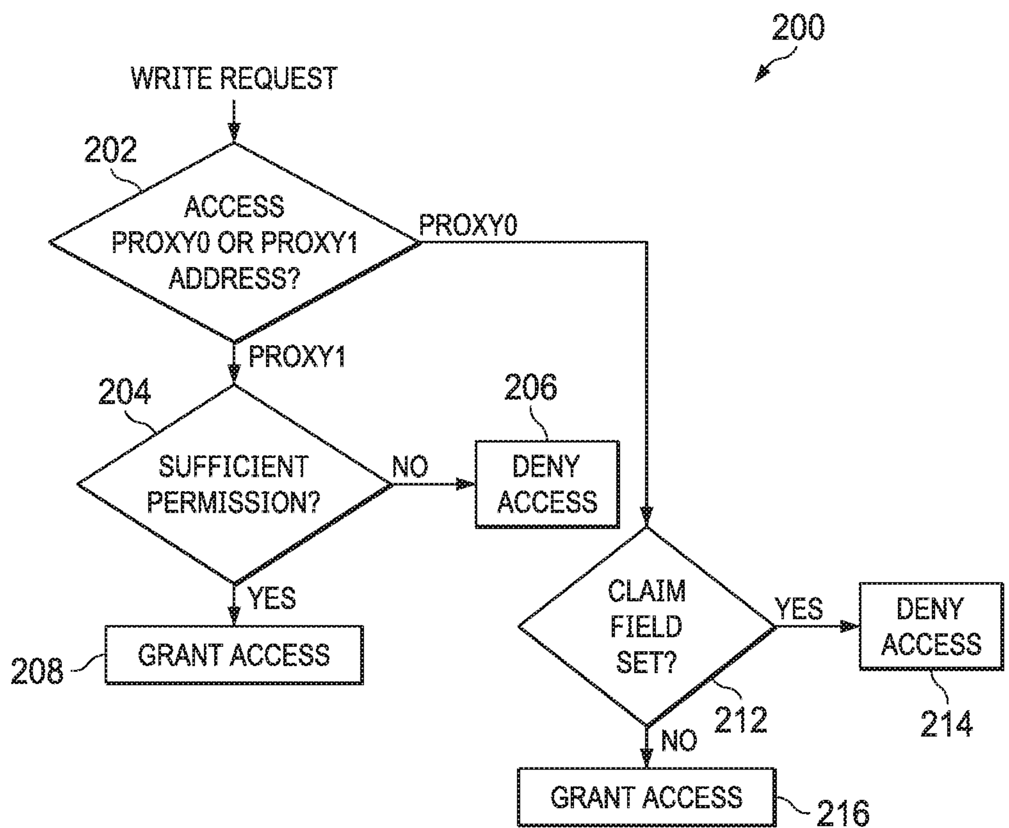
FIG. 2 shows a flow chart of a method in accordance with various examples.

FIG. 2 shows a flow chart of a method 200 in accordance with examples of this disclosure. The method 200 begins when a write request directed at an MMR is received at block 202 and it is determined whether the write request is directed to an address in a first address region (e.g., the Proxy0 address region) or to an address in a second address region (e.g., the Proxy1 address region). If the write request is directed to the Proxy1 address region, the method 200 continues in block 204 with determining whether a permission level associated with the originator (e.g., one of the processors 102, 104) the write request is above a permission threshold. For example, the critical processor 102 permission level is above the permission threshold, while the non-critical processor 104 permission level is below the permission threshold.

If the permission level associated with the originator is above the permission threshold, the method 200 continues in block 208 with granting the write request. In some cases, the sufficiently high-permission (e.g., having a permission level above the permission threshold) originator entity (e.g., the critical processor 102) may require protected access to the MMR, and thus generates a separate write to the claim register 122 to update the associated claim field or bit to indicate that the sufficiently high-permission entity is protecting the MMR to which the write request was directed. As explained above, the sufficiently high-permission entity may generate the separate write request to the claim register 122 before or after generating the write request for a MMR.

Referring back to block 202, if the write request is directed to the Proxy0 address region, the method 200 continues in block 212 with determining whether a claim field (e.g., a claim bit in this example) is set, which indicates that a higher-permission entity (e.g., the critical processor 102) is using the associated MMR 120. For example, if the critical processor 102 is using the MMR, the claim bit will be set. On the other hand, if the critical processor 102 is not using the MMR, the claim bit will not be set.

If the claim field or bit is set, the method 200 continues in block 214 with denying the write request. If the claim field or bit is not set, the method 200 continues in block 215 with granting the write request. Unlike the sufficiently high-permission entity above, a lower-permission entity (e.g., the non-critical processor 104 having a permission level below the permission threshold) write request to the claim register 122 is denied, although the lower-permission entity may read from the claim register in some examples.

Figure 3:
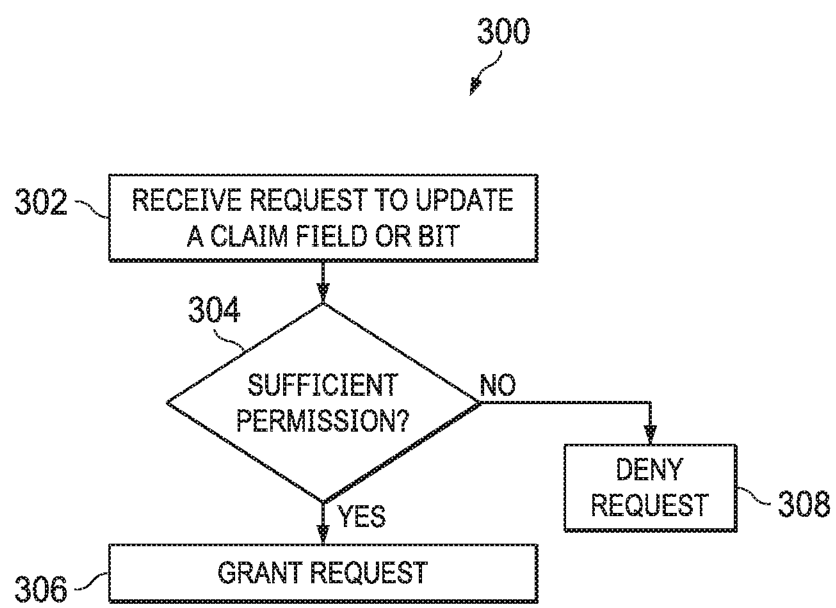
FIG. 3 shows a flow chart of another method in accordance with various examples.

FIG. 3 shows a flow chart of another method 300 in accordance with examples of this disclosure. The method 300 pertains to updating the claim fields or claim bits of the claim register 122. The method 300 begins in block 302 in which the claim register 122 receives a request to update a claim field or claim bit (depending on the particular implementation, as described above). Referring to the example of FIG. 1, only the critical processor 102 is permitted to set a claim bit to protect a particular MMR 120*a-n* from write access by the non-critical processor 104. The method 300 continues in block 304 with determining whether the request to update the claim field or claim bit originates from a process having a sufficiently high permission. For example, since the critical processor 102 directs its requests to update the claim register 122 to the Proxy1 region firewall 110, the claim register 122 receives such requests from the Proxy1 address decode 116. The non-critical processor 104 directs its requests to the Proxy0 region firewall 108 (and the Proxy1 region firewall would block such requests), and thus the claim register 122 receives such requests from the Proxy0 address decode 114. As a result, if the claim register 122 receives a request to update a claim field or claim bit from the Proxy0 address decode 114, the method 300 continues to block 308 and the request is denied. However, if the claim register 122 receives a request to update a claim field or claim bit from the Proxy1 address decode 116, the method 300 continues to block 306 and the request is granted and the claim field or claim bit is updated (e.g., set to a '1' or cleared to a '0' in the example of FIG. 1).

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:

a memory-mapped register (MMR);

a claim field associated with the MMR;

a claim logic circuit associated with the MMR;

a first firewall associated with a first address region including a first address mapped to the MMR; and a second firewall associated with a second address region including a second address mapped to the MMR;

wherein the first firewall is configured to pass a first write request for the first address in the first address region to the claim logic circuit associated with the MMR; and wherein the second firewall is configured to:

receive a second write request for the second address in the second address region; and grant or deny the second write request based on a permission level associated with the second write request.

2. The system of claim 1 wherein:

the first address of the first firewall is associated with a non-critical process;

the second address of the second firewall is associated with a critical process; and the claim logic circuit associated with the MMR is configured to grant or deny the first write request based on the first write request being received from the first firewall and being associated with the non-critical process and based on the claim field for the MMR.

3. The system of claim 2, wherein the claim logic circuit is further configured to deny the first write request in response to the claim field for its associated MMR being set.

4. The system of claim 2, wherein the claim logic circuit is further configured to grant the first write request in response to the claim field for its associated MMR being unset.

5. The system of claim 2, wherein the second firewall is configured to pass a third write request from a bus for the second address in the second address region to the claim logic circuit associated with the MMR, the claim logic circuit is further configured to grant the third write request.

6. The system of claim 2, further comprising a claim register containing the claim field, wherein the claim register is associated with a respective address in the first address region and a respective address in the second address region, and wherein the second firewall is further configured to deny a write request for the claim register received from the respective address in the first address region.

7. The system of claim 6, wherein the second firewall is further configured to grant a write request for the claim register received from the respective address in the second address region.

8. The system of claim 7, wherein the second firewall is further configured to grant a read request for the claim register received from the respective address in either the first or the second address region.

9. The system of claim 6, wherein the second firewall is further configured to grant the second write request in response to the permission level indicating the second write request is from the critical process.

10. A method comprising:

receiving, by executing one or more portions of a program with at least one processor, a first write request for a first address in a first address region associated with a first firewall, the first address in the first address region mapped to a memory-mapped register (MMR);

receiving, by executing one or more portions of a program with the at least one processor, a second write request for a second address in a second address region associated with a second firewall, the second address in the second address region mapped to the MMR; and granting, by executing an instruction with the at least one processor, the second write request based on a permission level associated with the second write request.

11. The method of claim 10, wherein:

the first address of the first firewall is associated with a non-critical process;

the second address of the second firewall is associated with a critical process; and the method further comprises granting, by executing one or more portions of a program with the at least one processor, the first write request based on the first write request being associated with the non-critical process and based on a claim field associated with the MMR.

12. The method of claim 11, further comprising granting the first write request in response to the claim field associated with the MMR being unset.

13. The method of claim 11, further comprising denying the first write request in response to the claim field associated with the one MMR being set.

14. The method of claim 11, wherein a claim register contains the claim field and is associated with a respective address in the first address region and a respective address in the second address region, the method further comprising denying a write request for the claim field received from the respective address in the first address region.

15. The method of claim 14, further comprising granting a write request for the claim field received from the respective address in the second address region.

16. The method of claim 14, further comprising granting a read request for the claim field received from the respective address in either the first or the second address region.

17. The method of claim 10, further comprising, granting the second write request in response to comparing the permission level with a threshold.

18. An apparatus comprising:

at least one memory;

one or more portions of a program in the apparatus; and processor circuitry to execute the one or more portions of a program to at least:

receive a first write request for a first address in a first address region associated with a first firewall, the first address in the first address region mapped to a memory-mapped register (MMR);

receive a second write request for a second address in a second address region associated with a second firewall, the second address in the second address region mapped to the MMR; and grant the second write request based on a permission level associated with the second write request.

19. The apparatus of claim 18 wherein the processor circuitry is to grant the first write request based on the first write request being associated with a non-critical process and based on a claim field associated with the MMR.

20. The apparatus of claim 18, wherein the processor circuitry is to grant the second write request in response to comparing the permission level with a threshold.

* * * * *